United States Patent
Zenner et al.

(10) Patent No.: US 10,239,416 B2
(45) Date of Patent: Mar. 26, 2019

(54) SYSTEM AND METHOD FOR IMPROVING REVERSE DRIVING CAPABILITY OF ELECTRIFIED VEHICLES

(71) Applicant: FORD GLOBAL TECHNOLOGIES, LLC, Dearborn, MI (US)

(72) Inventors: Thomas Zenner, Northrhine-Westfalia (DE); Daniel Benjamin Kok, Ann Arbor, MI (US); Derek Hartl, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/189,470

(22) Filed: Jun. 22, 2016

(65) Prior Publication Data

US 2017/0368955 A1    Dec. 28, 2017

(51) Int. Cl.
| | | |
|---|---|---|
| *B60L 11/18* | (2006.01) | |
| *B60K 6/44* | (2007.10) | |
| *B60L 11/14* | (2006.01) | |
| *B60W 10/06* | (2006.01) | |
| *B60W 30/18* | (2012.01) | |

(Continued)

(52) U.S. Cl.
CPC .......... *B60L 11/1861* (2013.01); *B60K 6/445* (2013.01); *B60L 11/14* (2013.01); *B60L 11/1862* (2013.01); *B60W 10/06* (2013.01); *B60W 10/08* (2013.01); *B60W 20/15* (2016.01); *B60W 30/18036* (2013.01); *B60K 6/365* (2013.01); *B60K 6/50* (2013.01); *B60L 2200/28* (2013.01); *B60L 2240/48* (2013.01); *B60L 2250/24* (2013.01); *B60Y 2200/91* (2013.01); *B60Y 2200/92* (2013.01); *B60Y 2300/18033* (2013.01); *B60Y 2300/28* (2013.01); *B60Y 2400/73* (2013.01); *Y02T 10/6239* (2013.01); *Y02T 10/6286* (2013.01); *Y02T 10/70* (2013.01); *Y02T 10/705* (2013.01); *Y02T 10/7005* (2013.01); *Y02T 10/7044* (2013.01);

(Continued)

(58) Field of Classification Search
CPC .. B60L 11/1861; B60L 2240/48; B60L 11/14; B60L 11/1862; B60L 2200/28; B60L 2250/24; B60Y 2200/91; B60Y 2300/28; B60Y 2200/92; B60Y 2400/73; B60Y 2300/18033; Y10S 903/903; Y10S 903/91; B60K 6/365; B60K 6/445; B60K 6/50; B60W 10/08; B60W 20/15; B60W 30/18036; B60W 10/06; B60W 6/50; Y02T 10/70; Y02T 10/6239; Y02T 10/6286; Y02T 10/705; Y02T 10/7005; Y02T 10/7044; Y02T 10/7077
See application file for complete search history.

(56) References Cited

U.S. PATENT DOCUMENTS

| | | | |
|---|---|---|---|
| 7,572,201 B2 | 8/2009 | Supina et al. | |
| 2003/0001391 A1* | 1/2003 | Kuang | B60K 6/445 290/40 C |

(Continued)

FOREIGN PATENT DOCUMENTS

DE    4121386 A1    1/1993

*Primary Examiner* — Rodney A Butler
(74) *Attorney, Agent, or Firm* — Carlson, Gaskey & Olds

(57) ABSTRACT

A method includes controlling an electrified vehicle by modifying a state of charge (SOC) window associated with an energy storage device of the electrified vehicle in response to a reverse driving event or a trailer towing event.

10 Claims, 6 Drawing Sheets

(51) Int. Cl.
  *B60W 20/15*   (2016.01)
  *B60W 10/08*   (2006.01)
  *B60K 6/445*   (2007.10)
  *B60K 6/365*   (2007.10)
  *B60K 6/50*   (2007.10)

(52) U.S. Cl.
  CPC ........ *Y02T 10/7077* (2013.01); *Y10S 903/903* (2013.01); *Y10S 903/91* (2013.01)

(56) References Cited

U.S. PATENT DOCUMENTS

| | | | |
|---|---|---|---|
| 2010/0065344 A1* | 3/2010 | Collings, III | B60L 11/126 180/2.1 |
| 2011/0264317 A1* | 10/2011 | Druenert | B60K 6/48 701/22 |
| 2013/0027048 A1* | 1/2013 | Schwarz | H01M 10/44 324/427 |
| 2014/0052337 A1 | 2/2014 | Lavoie et al. | |
| 2014/0129068 A1* | 5/2014 | Higa | B60K 6/445 701/22 |
| 2014/0229043 A1* | 8/2014 | Frank | B60W 20/20 701/22 |
| 2014/0303821 A1* | 10/2014 | Oda | H02J 7/1423 701/22 |
| 2015/0105948 A1* | 4/2015 | Chang | B60L 15/2009 701/22 |
| 2015/0120104 A1 | 4/2015 | Stefanon et al. | |
| 2015/0134162 A1* | 5/2015 | Yamazaki | B60W 30/182 701/22 |
| 2015/0232082 A1* | 8/2015 | Frank | B60W 20/10 701/22 |
| 2015/0360578 A1* | 12/2015 | Duan | B60L 11/1861 340/455 |
| 2016/0185216 A1* | 6/2016 | Clarke | B60K 17/35 74/665 F |
| 2017/0088122 A1* | 3/2017 | Yoon | B60W 40/076 |

* cited by examiner

SYSTEM AND METHOD FOR IMPROVING REVERSE DRIVING CAPABILITY OF ELECTRIFIED VEHICLES

TECHNICAL FIELD

This disclosure relates to vehicle systems and methods for controlling electrified vehicles. An exemplary vehicle system is adapted to modify a state of charge (SOC) window associated with a battery pack or other energy storage device of the electrified vehicle in response to detecting a reverse driving event or a trailer towing event.

BACKGROUND

The need to reduce automotive fuel consumption and emissions is well known. Therefore, vehicles are being developed that reduce reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on an internal combustion engine to drive the vehicle.

The internal combustion engine typically cannot deliver torque to propel the electrified vehicle drive wheels in reverse without incorporating complex mechanical devices into the electrified vehicle power transfer gearing. Therefore, many electrified vehicles, such as those employing a single-stage, power-split powertrain, power the vehicle drive wheels in reverse using power from the battery powered electric machine. The travel range of the electrified vehicle during a reverse driving event is thus limited at low battery state of charge (SOC) conditions. This may result in situations where the vehicle must be stopped to charge the battery to a SOC level sufficient to enable the drive to continue. Reverse driving limitations of electrified vehicles are even more pronounced during trailer towing events.

SUMMARY

A method according to an exemplary aspect of the present disclosure includes, among other things, controlling an electrified vehicle by modifying a state of charge (SOC) window associated with an energy storage device of the electrified vehicle in response to a reverse driving event or a trailer towing event.

In a further non-limiting embodiment of the foregoing method, the reverse driving event indicates that a shift device of the electrified vehicle has been positioned in a reverse driving position.

In a further non-limiting embodiment of either of the foregoing methods, the trailer towing event indicates that a trailer device has been electrically connected to the electrified vehicle.

In a further non-limiting embodiment of any of the foregoing methods, modifying the SOC window includes modifying a lower boundary of the SOC window to a lower minimum level if the reverse driving event has been detected.

In a further non-limiting embodiment of any of the foregoing methods, modifying the SOC window includes narrowing the SOC window if the trailer towing event has been detected and the electrified vehicle is traveling in a forward drive gear.

In a further non-limiting embodiment of any of the foregoing methods, narrowing the SOC window includes moving an upper boundary SOC level and a lower boundary SOC level of the SOC window closer toward one another.

In a further non-limiting embodiment of any of the foregoing methods, narrowing the SOC window includes moving each of the upper boundary SOC level, the lower boundary SOC level, a target SOC level, and a minimum SOC level of the SOC window toward a maximum SOC level of the SOC window.

In a further non-limiting embodiment of any of the foregoing methods, modifying the SOC window includes widening the SOC window if the trailer towing event has been detected and the reverse driving event has been detected.

In a further non-limiting embodiment of any of the foregoing methods, widening the SOC window includes moving an upper boundary SOC level and a lower boundary SOC level of the SOC window further apart from one another.

In a further non-limiting embodiment of any of the foregoing methods, widening the SOC window includes moving the upper boundary SOC level and a target SOC level toward a maximum SOC level of the SOC window and moving the lower boundary SOC level toward a minimum SOC level of the SOC window.

In a further non-limiting embodiment of any of the foregoing methods, the method includes analyzing a shift signal from a shift device to detect the reverse driving event.

In a further non-limiting embodiment of any of the foregoing methods, the method includes analyzing a trailer connection signal from a trailer tow module to detect the trailer towing event.

An electrified vehicle according to another exemplary aspect of the present disclosure includes, among other things, a set of drive wheels, an energy storage device configured to selectively supply power for propelling the drive wheels, and a control system configured with instructions for modifying a state of charge (SOC) window associated with the energy storage device in response to detecting a reverse driving event or a trailer towing event.

In a further non-limiting embodiment of the foregoing electrified vehicle, an engine is configured to selectively power the drive wheels.

In a further non-limiting embodiment of either of the foregoing electrified vehicles, the control system is configured to periodically communicate a power output request signal to the engine for commanding a specific power output from the engine.

In a further non-limiting embodiment of any of the foregoing electrified vehicles, a shift device is configured to communicate a shift signal to the control system for indicting the reverse driving event.

In a further non-limiting embodiment of any of the foregoing electrified vehicles, a trailer tow module is configured to communicate a trailer connection signal to the control system for indicating the trailer towing event.

In a further non-limiting embodiment of any of the foregoing electrified vehicles, the trailer connection signal indicates a trailer device has been electrically connected to the electrified vehicle.

In a further non-limiting embodiment of any of the foregoing electrified vehicles, the control system is configured to widen or narrow the SOC window in response to detecting the trailer towing event.

In a further non-limiting embodiment of any of the foregoing electrified vehicles, the control system is configured to modify a lower boundary of the SOC window to a lower minimum level in response to detecting the reverse driving event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a system and method for controlling an electrified vehicle in a manner that improves its reverse driving capabilities. A state of charge (SOC) window associated with a battery pack or other energy storage device of the electrified vehicle may be automatically adjusted in response to detecting either a reverse driving event or a trailer towing event of the vehicle. The proposed system and method improves the travel range during reverse driving without substantially effecting vehicle durability or fuel economy.

In some embodiments, the SOC window associated with the battery pack is automatically narrowed by increasing the low SOC boundary if the electrified vehicle is travelling in a forward drive gear and a trailer device connection has been detected. Narrowing the SOC window in this manner increases or maintains the battery pack SOC at a level sufficient for powering an anticipated reverse driving event.

In other embodiments, the SOC window of the battery pack 24 is automatically widened if a reverse drive gear and a trailer device connection have been detected. Widening the SOC window in this manner increases the amount of power available during reverse driving events.

In other embodiments, a lower boundary of the SOC window is automatically adjusted to a smaller SOC percentage in response to detecting a reverse driving event. Adjusting the lower boundary of the SOC window in this manner increases the amount of power available during reverse driving events. These and other features are discussed in greater detail in the following paragraphs of this detailed description.

Figure 1:
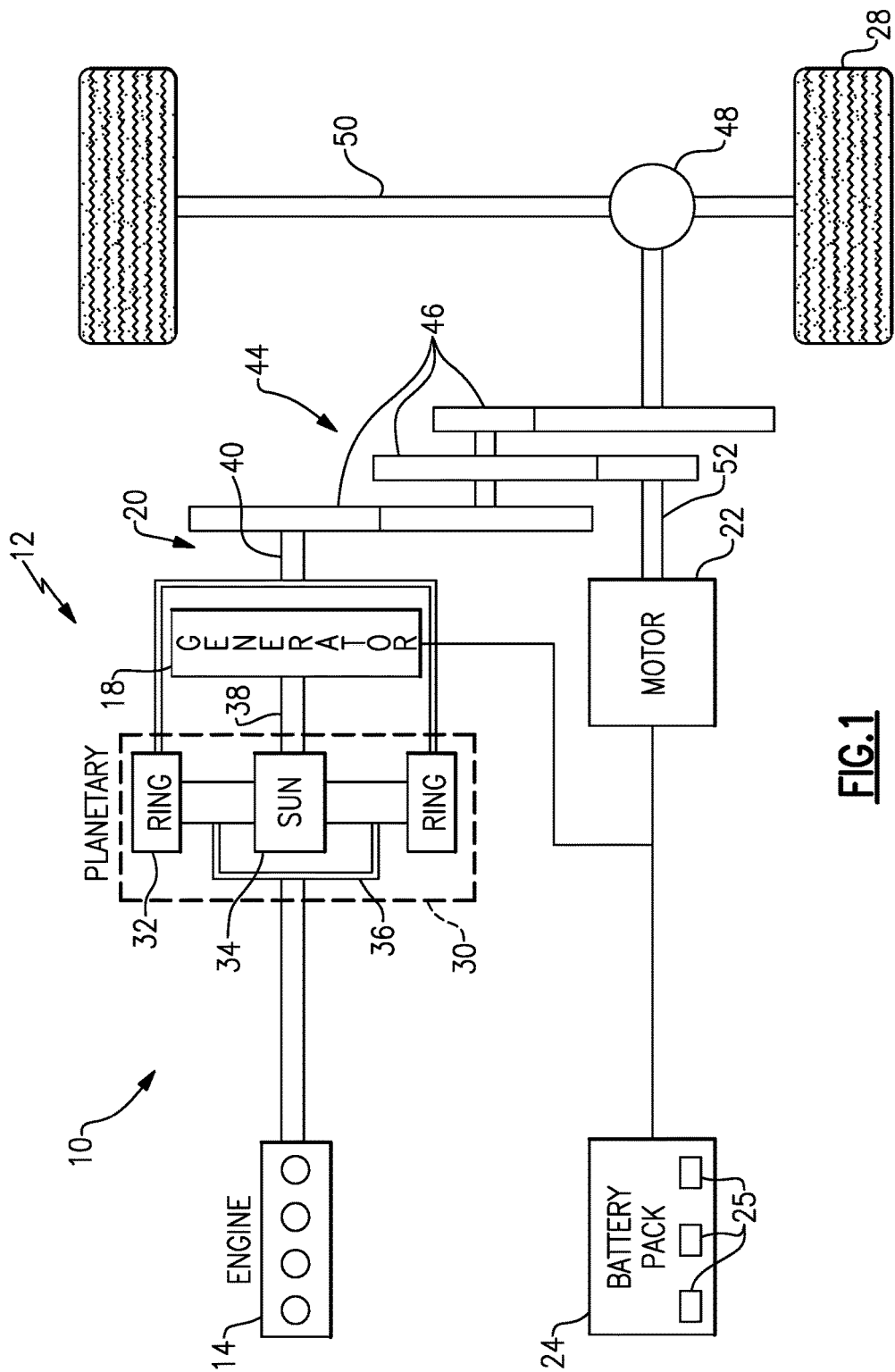
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's).

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, other powertrain configurations could also benefit from the teachings of this disclosure.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12. Non-limiting examples include hydraulic, pneumatic, kinetic, or electrostatic energy storage systems.

In another non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
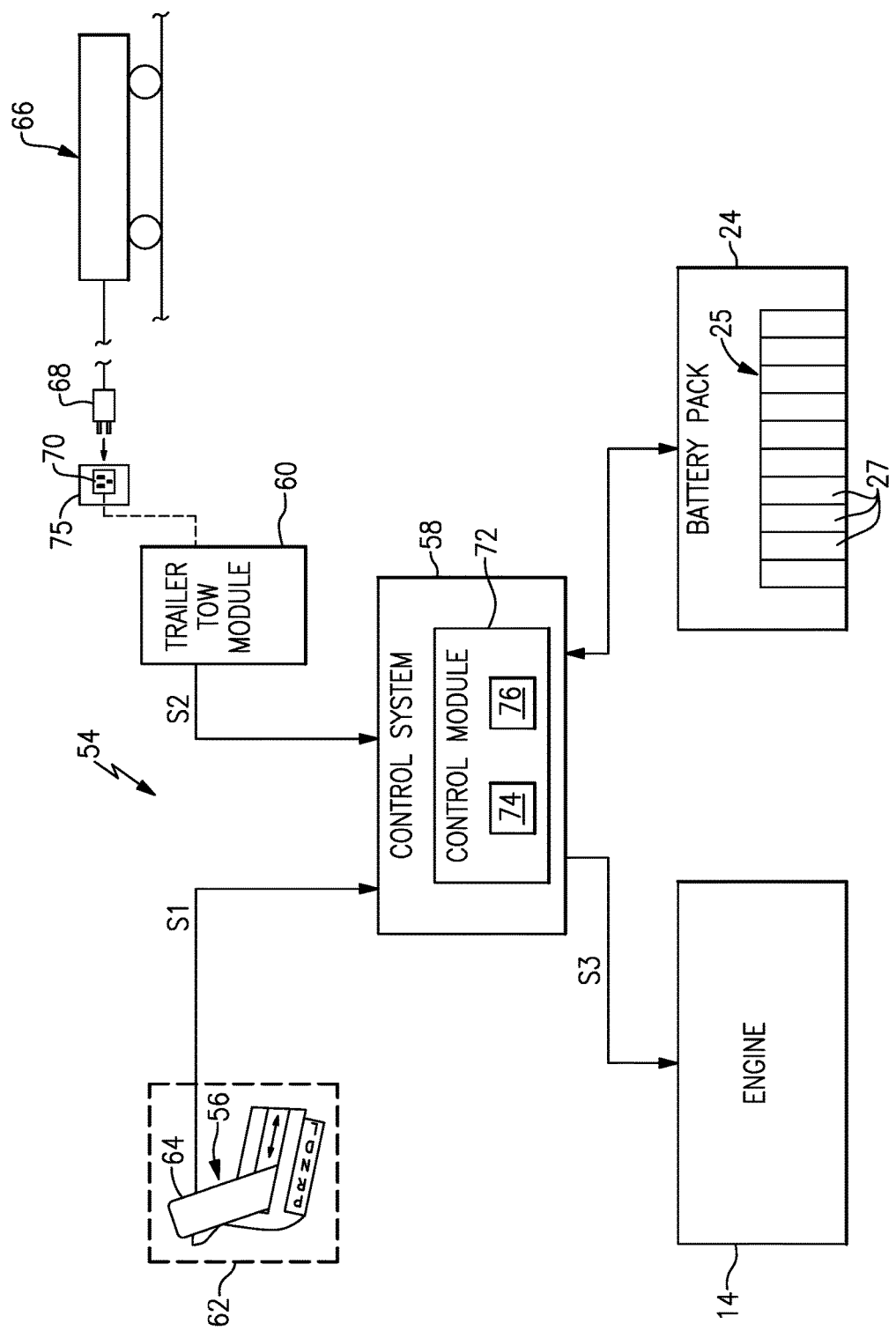
FIG. 2 illustrates a vehicle system of an electrified vehicle.

FIG. 2 is a highly schematic depiction of a vehicle system 54 for an electrified vehicle. For example, the vehicle system 54 could be incorporated for use within the electrified vehicle 12 of FIG. 1 or any other electrified vehicle. As explained in greater detail below, the vehicle system 54 is adapted to automatically modify a state of charge (SOC) window associated with the battery pack 24 of the electrified vehicle 12 in response to detecting either a reverse driving event or a trailer towing event of the electrified vehicle 12.

In a non-limiting embodiment, the vehicle system 54 includes a shift device 56, a control system 58, a trailer tow module 60, an engine 14, and a battery pack 24. The shift device 56 is located within a passenger compartment 62 (shown schematically) located onboard the electrified vehicle and is generally used to change a gear of the electrified vehicle. For example, in a non-limiting embodiment, the driver may select a forward driving gear (e.g., D or L gear) or a reverse driving gear (e.g., R gear) using the shift device 56. When the shift device 56 is moved from a neutral gear (e.g., Park or Neutral) to a drive gear (e.g., Drive, Reverse, Low, etc.), a shift signal S1 is communicated to the control system 58 indicating that the driver has selected a desired driving gear. In this disclosure, the term "reverse driving event" indicates that the driver has selected a reverse driving gear with the shift device 56.

The shift device 56 may be configured as a gear shift lever that includes a moveable handle 64. However, in other non-limiting embodiments, the shift device 56 is an electronic shift device that includes one or more joy sticks, dials, and/or buttons for selecting a drive gear of the electrified vehicle 12. In yet another non-limiting embodiment, the shift device 56 is an electronically controlled device that is not necessarily physically actuated, such as for use in autonomous vehicles, for example.

The trailer tow module 60 is adapted to detect the connection of a trailer device 66 to the electrified vehicle 12. The trailer device 66 could be a boat trailer, a cargo trailer, or any other device that a driver wishes to tow using the electrified vehicle 12. The trailer tow module 60 can detect the connection of the trailer device 66 in any known manner. In a first non-limiting embodiment, the trailer tow module 60 detects an electrical connection between an electrical plug 68 of the trailer device 66 and an electrical outlet 70 of a trailer tow bar 75 mounted to the electrified vehicle 12. In another non-limiting embodiment, the trailer tow module 60 is equipped with one or more sensors for detecting the presence of a connected trailer device 66. In yet another non-limiting embodiment, the trailer tow module 60 wirelessly detects the presence of a connected trailer device 66. In yet another non-limiting embodiment, the trailer tow module 60 detects the presence of a connected trailer device 66 based on the load the trailer device 66 puts on the electrified vehicle 12. When the trailer tow module 60 detects the presence of the trailer device 66, a trailer connection signal S2 can be communicated to the control system 58. The trailer connection signal S2 signifies that a trailer towing event of the electrified vehicle 12 has begun. Thus, in this disclosure, the term "trailer towing event" indicates that a trailer device 66 is connected to and being towed by the electrified vehicle 12.

The engine 14 may be an internal combustion engine. The engine 14 could alternatively be any other type of power source capable of generating electricity.

The battery pack 24 may include one or more battery assemblies 25 each having a plurality of battery cells 27, or any other type of energy storage device. The battery cells 27 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The SOC level of the battery pack 24, which is commonly represented as a percentage, indicates the amount of energy currently available from the battery cells 27. For example, an SOC level of 100% indicates that the battery cells 27 are fully charged, whereas an SOC level of 0% indicates that the battery cells 27 are completely depleted of energy.

The control system 58 could be part of an overall vehicle system controller (VSC) or could be a separate control system that communicates with the VSC. The control system 58 includes one or more control modules 72 equipped with executable instructions for interfacing with and commanding operation of various components of the vehicle system 54. For example, in a non-limiting embodiment, each of the shift device 56, trailer tow module 60, the engine 14 and the battery pack 24 include a control module, and these control modules can communicate with one another over a controller area network (CAN) to control the electrified vehicle 12. In another non-limiting embodiment, each control module 72 of the control system 58 includes a processing unit 74 and non-transitory memory 76 for executing the various control strategies and modes of the vehicle system 54. Exemplary control strategies of the vehicle system 54 are further discussed below with reference to FIGS. 4 and 5.

One exemplary function of the control system 58 is to automatically adjust an SOC window of the battery pack 24 during certain vehicle conditions to improve reverse driving capabilities of the electrified vehicle 12. In a first non-limiting embodiment, the control system 58 automatically adjusts the SOC window of the battery pack 24 if the shift signal S1 indicates a reverse driving event. In another non-limiting embodiment, the control system 58 automatically adjusts the SOC window of the battery pack 24 if the trailer connection signal S2 indicates a trailer towing event. Modifying the SOC window may include narrowing the SOC window, widening the SOC window, adjusting a lower boundary of the SOC window, etc. Exemplary SOC window adjustments are discussed in greater detail below with reference to FIGS. 3A-3D.

Another exemplary function of the control system 58 is to control operation of the engine 14 to maintain or increase the SOC of the battery pack 24 during certain driving events. For example, the control system 58 periodically communicates a power output request signal S3 to the engine 14. The power output request signal S3 commands the engine 14 to produce a specific power output. In a non-limiting embodiment, the power output of the engine 14 is controlled to generate a greater amount of power than is necessary to propel the electrified vehicle 12. This additional power can be used to charge the battery pack 24 to a higher SOC level, or to maintain a certain SOC level of the battery pack 24. In a non-limiting embodiment, the addition power is consumed by the electric machine 18, which is being operated as a generator.

FIGS. 3A-3D, with continued reference to FIGS. 1-2, schematically illustrate exemplary SOC windows of the battery pack 24. The SOC windows are associated with various driving events (e.g., normal, reverse driving, trailer towing, etc.) of the electrified vehicle 12. The SOC window associated with the battery pack 24 may be periodically adjusted to improve reverse driving capabilities of the electrified vehicle 12.

Figure 3A:
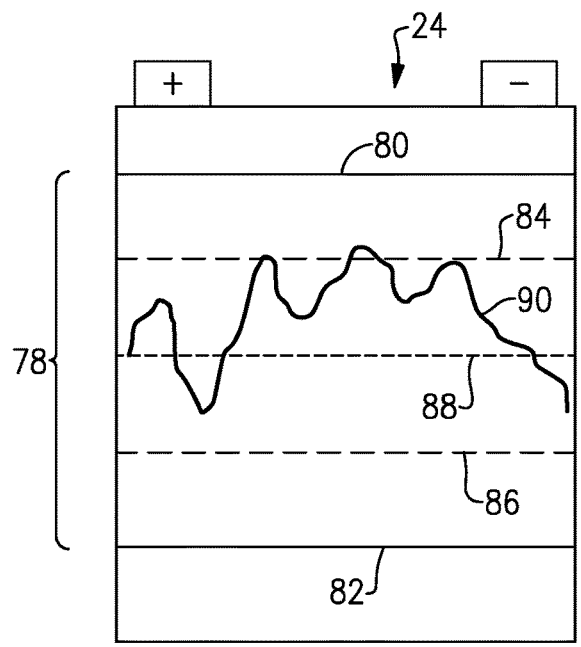
FIGS. 3A, 3B, 3C, and 3D schematically illustrate state of charge (SOC) windows associated with an electrified vehicle battery pack during various drive conditions.

FIG. 3A, for example, illustrates a normal SOC window 78 associated with the battery pack 24. The normal SOC window 78 is employed during normal driving events, which generally occur when the electrified vehicle 12 is neither in reverse gear nor towing a trailer device 66. The normal SOC window 78 includes a maximum SOC level 80, a minimum SOC level 82, an upper boundary SOC level 84, a lower boundary SOC level 86, and a target SOC level 88. The electrified vehicle 12 is controlled during normal driving events to maintain a SOC 90 of the battery pack 24 between the upper and lower boundary SOC levels 84, 86. In a non-limiting embodiment, the power output of the engine 14 is modified during the normal driving event to maintain the SOC 90 within the normal SOC window 78.

Figure 3B:
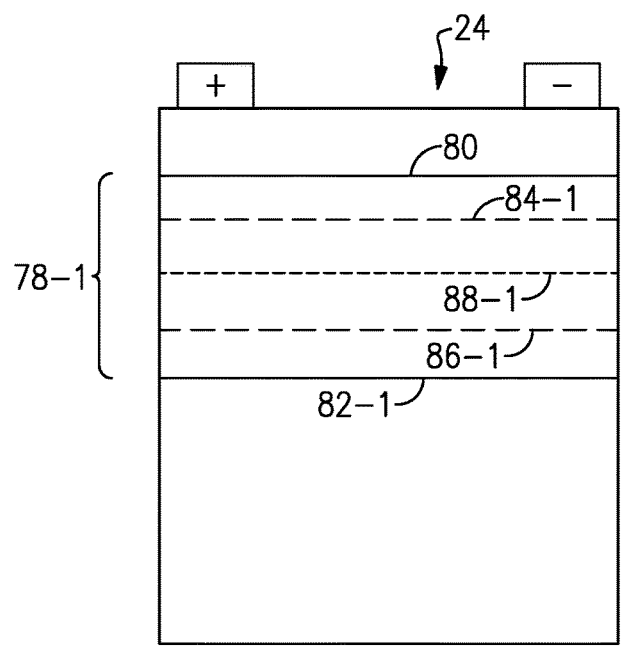

FIG. 3B illustrates a modified SOC window 78-1 associated with the battery pack 24. The SOC window is automatically narrowed to the modified SOC window 78-1 if the electrified vehicle 12 is travelling in a forward drive gear (e.g., shift signal S1 indicates D or L) and a trailer device connection has been detected (e.g., trailer connection signal S2 indicates trailer device 66 is connected). The modified SOC window 78-1 is considered "narrowed" in that upper and lower boundary SOC levels 84-1 and 86-1 are moved closer toward one another. In another non-limiting embodiment, each of the upper and lower boundary SOC levels 84-1, 86-1, the target SOC level 88-1, and the minimum SOC level 82-1 are moved closer to the top of the SOC window 78-1, or raised to a higher SOC percentage that is closer to the maximum SOC level 80-1, if the electrified vehicle 12 is travelling in a forward drive gear and a trailer device connection has been detected. Employing the modified SOC window 78-1 increases or maintains the SOC of the battery pack 24 at a level sufficient for powering an anticipated reverse driving event, which is considered to be likely due to the confirmed connection of the trailer device 66.

Figure 3C:
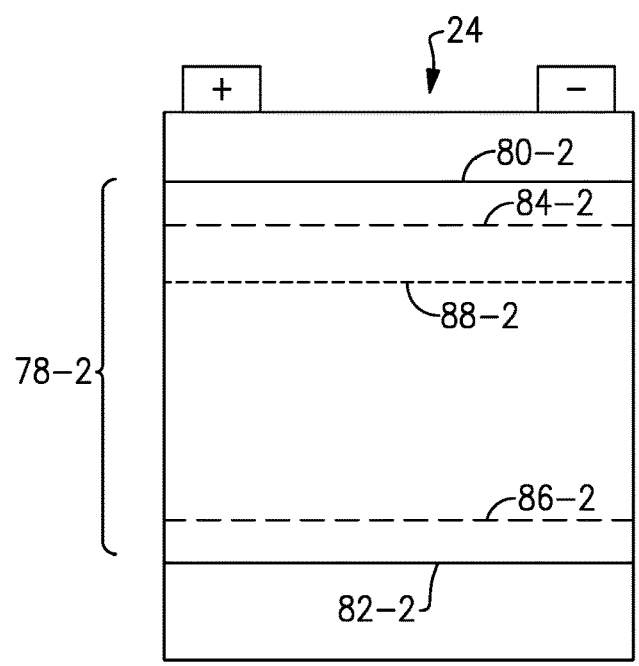

FIG. 3C illustrates another exemplary modified SOC window 78-2 associated with the battery pack 24. The SOC window is automatically widened to the levels illustrated by modified SOC window 78-2 if the electrified vehicle 12 is travelling in a reverse drive gear (e.g., shift signal S1 indicates R) and a trailer device connection has been detected (e.g., trailer connection signal S2 indicates trailer device 66 is connected). The modified SOC window 78-2 is considered "widened" in that upper and lower boundary SOC levels 84-2 and 86-2 are moved further apart from one another. In a non-limiting embodiment, the widened SOC window 78-2 is achieved by moving the upper boundary SOC level 84-2 and the target SOC level 88-2 toward the maximum SOC level 80-2 (i.e., raising the SOC percentage of these values) and moving the lower boundary SOC level 86-2 toward the minimum SOC level 82-2 (i.e., lowering the SOC percentage of this value). Modifying the SOC window in this manner increases the amount of power available during reverse driving events.

Figure 3D:
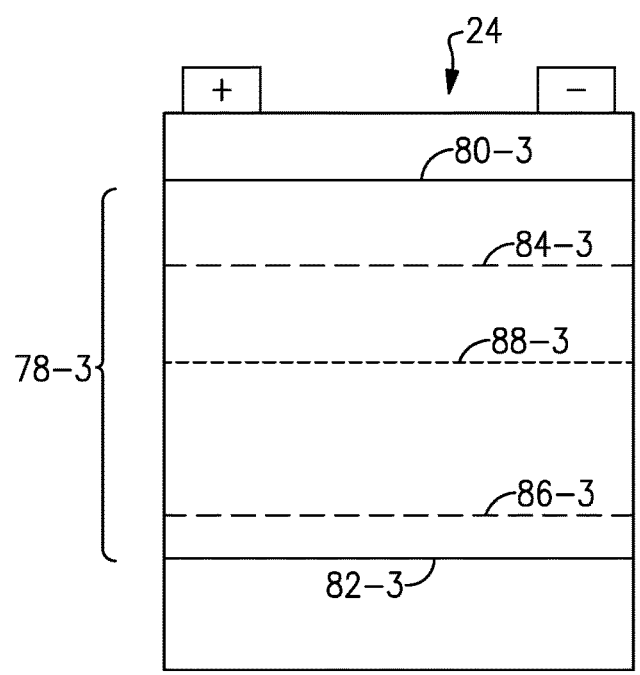

FIG. 3D illustrates yet another exemplary modified SOC window 78-3 associated with the battery pack 24. The SOC window is automatically adjusted to the levels indicated by the modified SOC window 78-3 if a reverse drive gear has been selected (e.g., shift signal S1 indicates reverse driving event). In a non-limiting embodiment, the SOC window is adjusted to the modified SOC window 78-3 by adjusting the lower boundary SOC level 86-3 to a greater minimum level in response to detecting the reverse driving event. In other words, the lower boundary SOC level 86-3 is moved closer to the minimum SOC level 82-3. A maximum SOC level 80-3, an upper boundary SOC level 84-3, and a target SOC level 88-3 are not modified in this non-limiting embodiment. Modifying the SOC window in this manner increases the amount of power available during reverse driving events.

Each of the modified SOC windows discussed above may be stored in one or more look-up tables within the non-transitory memory 76 of the control module 72 of the control system 58. Thus, the control system 58 can automatically control the electrified vehicle 12, by commanding the modified SOC window, based on the selected drive gear and based on whether or not a trailer device 66 has been connected to the electrified vehicle 12.

Figure 4:
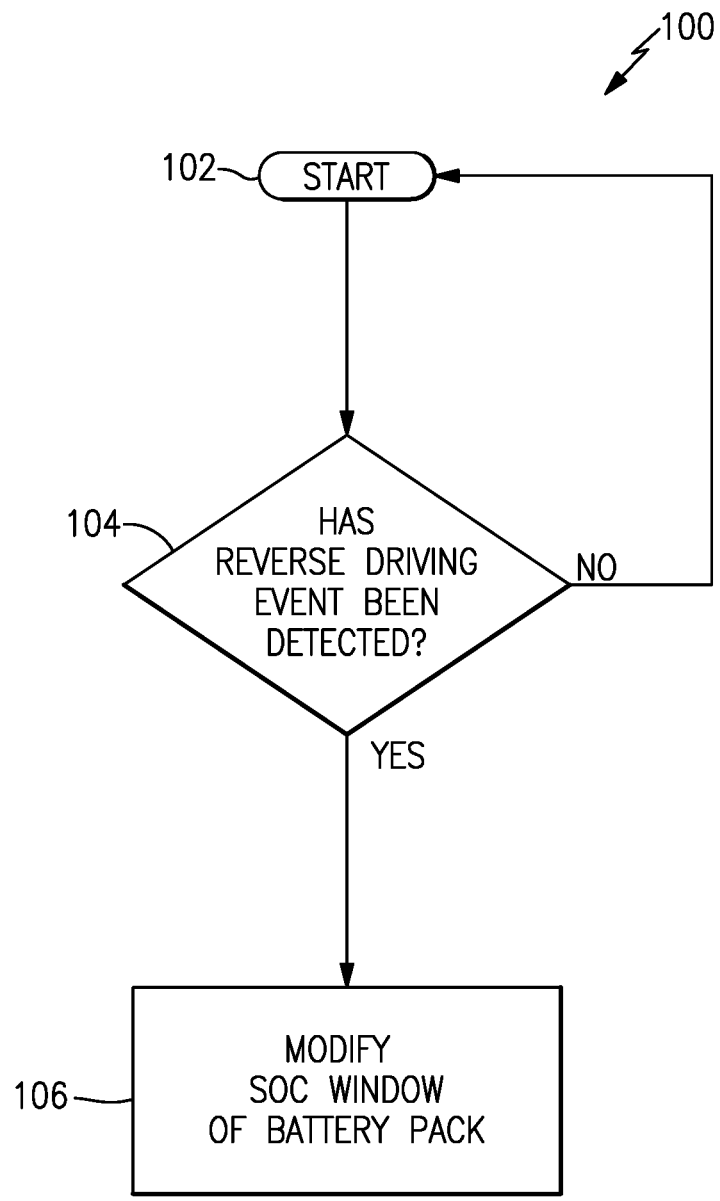
FIG. 4 schematically illustrates an exemplary control strategy for controlling an electrified vehicle during a reverse driving event.

FIG. 4, with continued reference to FIGS. 1 through 3D, schematically illustrates a control strategy 100 for controlling an electrified vehicle 12. For example, the control strategy 100 can be performed to control operation of the electrified vehicle 12 in a manner that increases the amount of power and energy available during reverse driving events. In one non-limiting embodiment, the control system 58 of the vehicle system 54 is programmed with one or more algorithms adapted to execute the exemplary control strategy 100, or any other control strategy. In another non-limiting embodiment, the control strategy 100 is stored as executable instructions in the non-transitory memory 76 of the control module 72 of the control system 58.

The control strategy 100 begins at block 102. At block 104, the control system 58 determines whether a reverse driving event has been detected. In other words, the control system 58 determines whether a reverse driving gear has been selected. In a non-limiting embodiment, the control system 58 analyzes the shift signal S1 from the shift device 56 to determine whether a reverse driving event is occurring.

If a reverse driving event is detected at block 104, the control strategy 100 proceeds to block 106. At this step, the SOC window 78 associated with the battery pack 24 is automatically modified. For example, in one non-limiting embodiment, the SOC window 78 is modified by adjusting a lower boundary SOC level 86 to a lower minimum level (see, e.g., SOC window 78-3 of FIG. 3D). In other words, the lower boundary SOC level 86 is adjusted to a lower percentage, thus increasing the amount of energy that is available during the reverse driving event.

Figure 5:
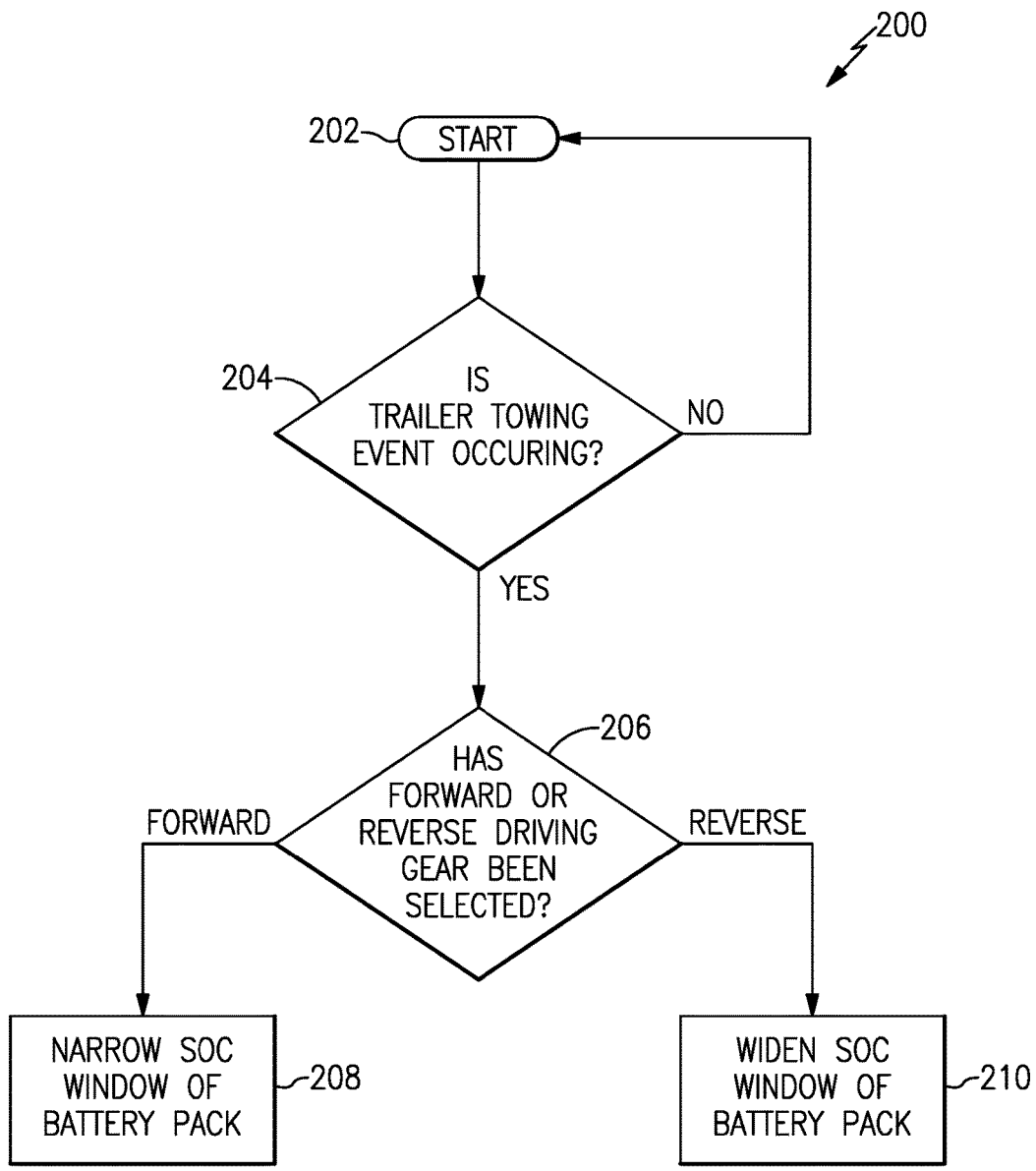
FIG. 5 schematically illustrates an exemplary control strategy for controlling an electrified vehicle during a trailer towing event.

FIG. 5, with continued reference to FIGS. 1 through 3D, schematically illustrates another exemplary control strategy 200 for controlling an electrified vehicle 12 in a manner that improves reverse driving capabilities. For example, the control strategy 200 can be performed to control operation of the electrified vehicle 12 during trailer tow events.

The control strategy 200 begins a block 202. Next, at block 204, the control system 58 determines whether a trailer towing event is occurring. In a non-limiting embodiment, a trailing towing event is considered to be occurring when the control system 58 receives the trailer connection signal S2 from the trailer tow module 60 indicating that the trailer device 66 is electrically connected to the electrified vehicle 12. If the trailer connection signal S2 has been received, the control strategy 200 proceeds to block 206.

At block 206, the control system 58 determines whether a forward or a reverse driving gear has been selected. In a non-limiting embodiment, the control system 58 analyzes the shift signal S1 from the shift device 56 to determine whether a forward or a reverse driving gear has been selected. If a forward driving gear has been selected, the control system 58 proceeds to block 208 and automatically narrows the SOC window 78 associated with the battery pack 24 (see, e.g., SOC window 78-1 of FIG. 3B). Alternatively, if a reverse driving gear has been selected, the control system 58 automatically widens the SOC window 78 associated with the battery pack 24 at block 210 (see, e.g., SOC window 78-2 of FIG. 3C).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a set of drive wheels;
   an energy storage device configured to selectively supply power for propelling said drive wheels; and
   a control system configured with instructions for narrowing a state of charge (SOC) window associated with said energy storage device by moving an upper boundary and a lower boundary of said SOC window closer toward one another in response to detecting a forward driving event and a trailer towing event.

2. The electrified vehicle as recited in claim 1, comprising an engine configured to selectively power said drive wheels.

3. The electrified vehicle as recited in claim 2, wherein said control system is configured to periodically communicate a power output request signal to said engine for commanding a specific power output from said engine.

4. The electrified vehicle as recited in claim 1, comprising a shift device configured to communicate a shift signal to said control system for indicting said forward driving event.

5. The electrified vehicle as recited in claim 1, comprising a trailer tow module configured to communicate a trailer connection signal to said control system for indicating said trailer towing event.

6. The electrified vehicle as recited in claim 5, wherein said trailer connection signal indicates a trailer device has been electrically connected to said electrified vehicle.

7. The electrified vehicle as recited in claim 1, wherein said control system is configured to widen or narrow said SOC window in response to detecting said trailer towing event.

8. The electrified vehicle as recited in claim 1, wherein said control system is configured to modify the lower boundary of the SOC window to a lower minimum level in response to detecting a reverse driving event.

9. An electrified vehicle, comprising:
   a battery pack; and
   a control system configured with instructions for automatically narrowing a state of charge (SOC) window associated with said battery pack when a trailer towing event is detected and the electrified vehicle is traveling in a forward drive gear, and automatically widening the SOC window by moving an upper boundary and a lower boundary of the SOC window further apart from one another when the trailer towing event is detected and the electrified vehicle is traveling in a reverse drive gear.

10. An electrified vehicle, comprising:
    a set of drive wheels;
    an energy storage device configured to selectively supply power for propelling said drive wheels; and
    a control system configured with instructions for widening a state of charge (SOC) window associated with said energy storage device by moving an upper boundary and a lower boundary of said SOC window further apart from one another in response to detecting a reverse driving event and a trailer towing event.

* * * * *